United States Patent [19]

Chappell

[11] Patent Number: 5,035,440
[45] Date of Patent: Jul. 30, 1991

[54] PUMP

[75] Inventor: Gilmore H. Chappell, Deptford, N.J.

[73] Assignee: Chappell International, Inc., Westville, N.J.

[21] Appl. No.: 391,350

[22] Filed: Aug. 9, 1989

[51] Int. Cl.⁵ .............................................. B65B 3/04
[52] U.S. Cl. .................................. 280/201; 280/288.4
[58] Field of Search ................ 280/201, 288.4; 92/15, 92/21 MR, 23, 24, 161, 165 R, 169.1; 417/236, 511, 546, 547, 554, 555.1; 222/153

[56]   References Cited
U.S. PATENT DOCUMENTS

| | | | |
|---|---|---|---|
| 549,308 | 11/1895 | Blackman & Cone | 280/201 |
| 554,084 | 2/1896 | Ostrander | 280/201 |
| 588,840 | 8/1897 | Simpson | 280/201 |
| 589,711 | 9/1897 | Foote | 280/201 |
| 632,696 | 9/1899 | Buxbaum | 280/201 |
| 657,845 | 9/1900 | Wolbrecht | 280/201 |
| 668,214 | 2/1901 | Rast | 280/201 |
| 674,829 | 5/1901 | Furbow | 280/201 |
| 679,512 | 7/1901 | Rock | 280/201 |
| 700,841 | 5/1902 | Smith | 280/201 |
| 702,743 | 6/1902 | Pratt | 280/201 |
| 702,976 | 6/1902 | Lymburner | 280/201 |
| 797,231 | 8/1905 | Scanlan | 280/201 |
| 802,695 | 10/1905 | Ingham et al. | 280/201 |
| 849,227 | 4/1907 | Gilberti | 280/201 |
| 877,337 | 1/1908 | Herr | 280/201 |
| 1,091,435 | 3/1914 | Johnson | 280/201 |
| 1,270,661 | 6/1918 | Reed | 280/201 |
| 1,319,137 | 10/1919 | Black et al. | 280/201 |
| 1,886,158 | 11/1932 | Brown | 417/555.1 |
| 1,933,223 | 10/1933 | Skui | 280/201 |
| 2,027,758 | 1/1936 | Zucker | 280/201 |
| 2,287,360 | 6/1942 | Sappington | 417/460 |
| 2,858,767 | 11/1958 | Smith | 417/346 |
| 2,901,980 | 9/1959 | Jordan | 417/495 |
| 3,832,141 | 8/1974 | Haldopoulos | 422/101 |
| 3,904,325 | 9/1975 | Olofsson et al. | 417/512 |
| 4,712,592 | 12/1987 | Brown | 280/201 X |
| 4,775,303 | 10/1980 | Liska | 417/554 |
| 4,842,290 | 6/1989 | Alioto | 280/201 |

FOREIGN PATENT DOCUMENTS

| | | |
|---|---|---|
| 955796 | 10/1974 | Canada . |
| 0093691 | 11/1983 | European Pat. Off. . |
| 874256 | 3/1953 | Fed. Rep. of Germany . |
| 1019450 | 1/1953 | France ............... 417/511 |
| 305325 | 2/1933 | Italy ................. 280/201 |
| 27688 | of 1897 | United Kingdom ........ 280/201 |
| 696168 | 8/1953 | United Kingdom . |

Primary Examiner—Charles A. Marmor
Assistant Examiner—Victor E. Johnson
Attorney, Agent, or Firm—Panitch Schwarze Jacobs & Nadel

[57]   ABSTRACT

An air pump particularly suitable for use with bicycles includes a first elongated tube forming a pump chamber and housing, a second elongated tube coupled with a piston through a connecting rod to reciprocate the piston within the pump chamber, and a flexible hose pneumatically coupled at one end with an air passage extending through the piston and having at its opposing end an air valve coupling. The first and second elongated tubes have outer diameters of a size permitting them to be received in and clamped by a seat tube collar of a bicycle frame and the seat post collar of a seat of the bicycle. The piston includes an annular sliding valve member used with a tapered annular valve seat which permits air compression to pressures of about 200 psi while preventing blowby. A second valve along the air passage prevents back flow. The elongated tubes are fixedly secured together in a releasable fashion to prevent relative axial motion or rotation, permitting the use of the pump as a bicycle seat post.

19 Claims, 3 Drawing Sheets

PUMP

FIELD OF THE INVENTION

The invention relates to pumps and, in particular, to air pumps suitable for manual manipulation and internal installation in bicycles.

BACKGROUND OF THE INVENTION

A variety of manually actuable air pumps have been devised particularly for use with bicycles.

A large number of these air pumps use a portion of the bicycle frame as the pump housing and chamber. The major advantage provided by most if not all of these pumps is that they permit manual operation of the pump without having to remove the pump from the bicycle. In many cases, the seat is coupled with an arm of the pump carrying the pump piston to permit reciprocation of the piston operating the pump.

These types of pumps also suffer from several disadvantages. First, the pump is not removable from the bicycle itself since the frame forms a portion of the pump. Second, in many cases such pumps include components which are mounted within the frame members that are thereafter brazed or welded together making subsequent access to the components for repair difficult or impossible without adversely affecting the frame or the finish of the bike. Third, the tubing used in most, though not necessarily all bicycle frames tends to be rather thin and of average commercial quality. Such tubing is weakened and subject to corrosion in areas where it is penetrated, for example to provide air pump fittings.

A lesser number of air pumps designed for use with bicycles include separate pump housings which may be removed from a bicycle frame internally receiving the pump. The major disadvantage of such pumps is that, in all cases known, they must be removed from the bicycle frame to permit operation.

Another major disadvantage of all known, manually operated air pumps is their limited pressure capability. Virtually all such pumps use as their piston, a flexible diaphragm having an outer circumferential portion which is formed to permit air to pass when a partial suction is created within the pump chamber and to prevent blowby when air is being compressed in the pump chamber. However, this design has a maximum pressure capability of about 100 psi or less before compressed air blowby will occur.

SUMMARY OF THE INVENTION

In one aspect, the invention is a manually-operable air pump comprising a housing containing a pump chamber having a closed end. It further comprises a piston assembly including a piston within the chamber, a connecting arm having a first end coupled with the piston and an opposing second end, and an air passage extending generally axially through the piston. The pump further comprises means coupled with the connecting arm for manually reciprocating the piston in the chamber. The pump further comprises first, one-way valve means on the piston for compressing air in the closed end of the chamber when the piston is moved in a first axial direction towards the closed end of the chamber and for permitting air to enter the closed end of the chamber when the piston is moved in a second, opposing axial direction away from the closed end of the chamber. The pump further comprises second, one-way valve means along the air passage for permitting air to pass from the chamber into the air passage when the piston is being moved in the first axial direction and for preventing air from passing through the air passage into the chamber when the piston is being moved in the second axial direction.

In another aspect, the invention includes a high-pressure manually operable pump comprising a pump housing including a pump chamber, a piston in the chamber, manual actuating means coupled with the piston for reciprocating the piston within the chamber, and one-way valve means on the piston. According to this aspect of the invention, the valve means includes a groove extending circumferentially around an outer surface of the piston and an annular valve member in the groove. The circumferential groove has an axial dimension greater than a maximum axial dimension of the valve member to permit axial movement of the valve member along the groove in the axial direction. The valve means further includes a tapered valve seat at one axial end of the groove. One of the valve member and the valve seat is resiliently deformable so that when the valve member seats on the valve seat the resiliently deformable one deforms radially outwardly for sealing a gap between the outer surface of the piston and an inner circumferential surface of the chamber.

In another aspect, the invention is a bicycle seat post air pump which comprises a first elongated tube having a length and outer diameter sufficient for removable receipt in a seat tube of a bicycle frame and clamping by a collar of the seat tube. It further comprises a second elongated tube having a length less than the first elongated tube length and an outer diameter less than the first elongated tube outer diameter, the length and outer diameter of the second elongated tube being sufficient for removable receipt and clamping of the second elongated tube in a seat post collar of a bicycle seat. One of the first and second elongated tubes forms a pump chamber and the remaining one of the first and second elongated tubes is coupled with a piston in the pump chamber for reciprocating the piston. The pump further comprises means for fixedly securing together the first and second elongated tubes. The pump further comprises a flexible air hose having a first end coupled with the second elongated tube and an air valve coupling at a second end of the flexible air hose.

BRIEF DESCRIPTION OF THE DRAWINGS

The foregoing summary, as well as the following detailed description of the preferred embodiment in the invention, will be better understood when read in conjunction with the appended drawings. For the purpose of illustrating the invention, there is shown in the drawings, embodiment(s) which are presently preferred. It should be understood, however, that the invention is not limited to the precise arrangements and instrumentalities shown. In the drawings.

DETAILED DESCRIPTION OF PREFERRED EMBODIMENTS

In the figures, like numerals are used to indicate like elements.

Figure 1:
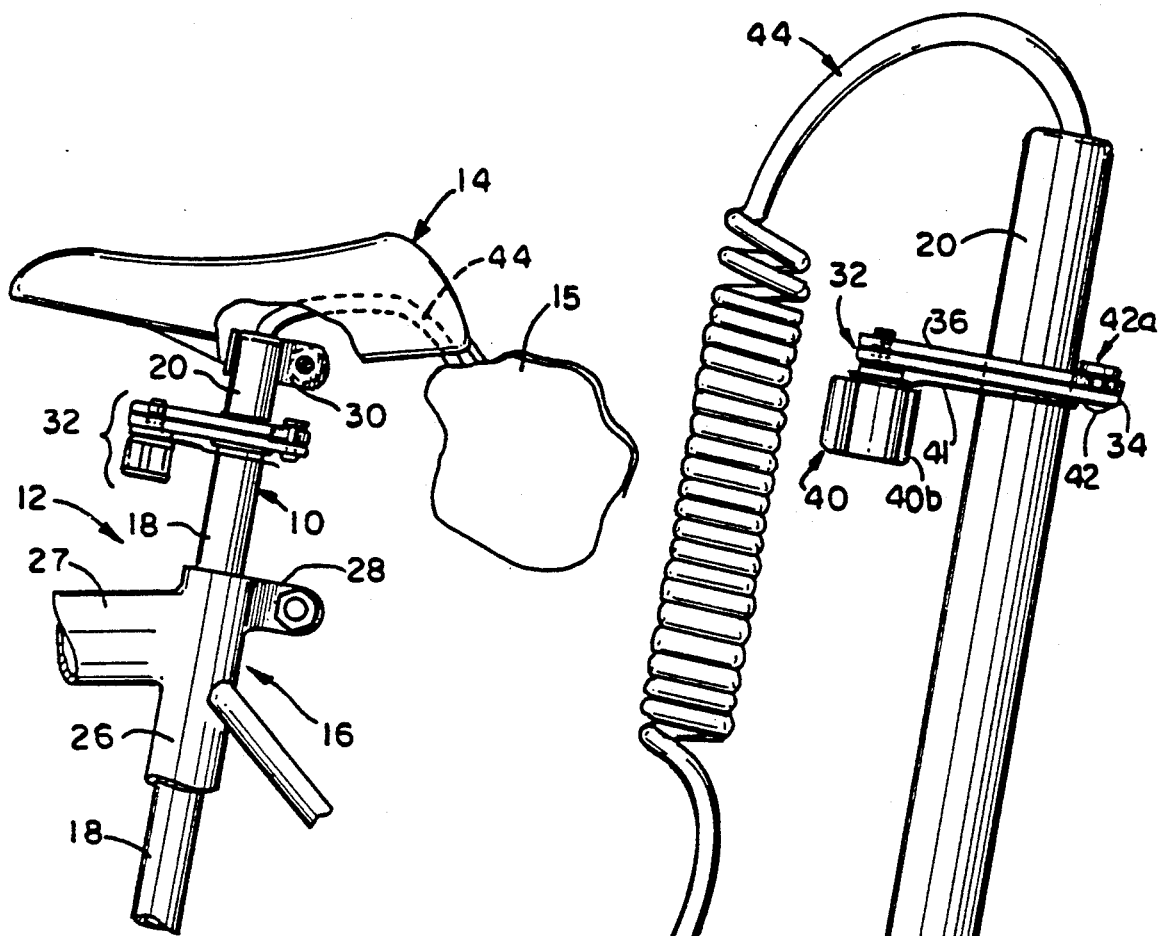
FIG. 1 is an isometric view of a preferred embodiment, high pressure, manually operable air pump of the present invention mounted on a bicycle.

FIG. 1 depicts a preferred embodiment high pressure, manually-operable air pump of the present invention, indicated generally at 10, in a preferred mounting on a bicycle, a portion of which is depicted and indicated generally at 12. The air pump 10 of the present invention is used as the seat post coupling the seat 14, to the bike frame, indicated generally at 16. A lower end of the pump 10 is received in the seat tube 26 of the frame 12 and is clamped in the frame 12 with the collar 28 provided at the mouth of the seat tube 26. The upper end of the pump 10 is received and clamped in the seat post collar 30 (sectioned in FIG. 1) of the seat 14.

Figure 2:
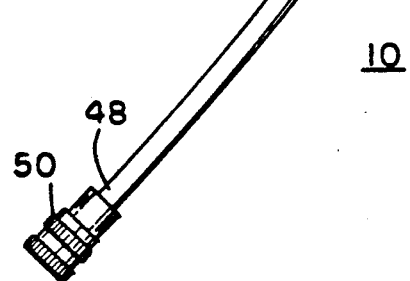
FIG. 2 is a side elevation of the preferred embodiment air pump of FIG. 1 removed from the bicycle.

Referring to FIG. 2, where the preferred air pump 10 is shown separated from the bicycle 12, the pump 10 includes a first elongated tube 18 and a second elongated tube 20, shorter than and coaxial with the first tube 18. The first tube 18 has an outer diameter sufficient to permit that tube to be removably received in the seat tube 26 of the frame 16 and clamped to the frame by a collar 28 (see FIG. 1) of the seat tube 26. Preferably, the outer diameter of the first tube is between about seven-eighths and one inch. The first tube 18 preferably also has a length sufficient to permit adequate height adjustment of the seat 14. Preferably, the first tube length is at least about twelve inches.

The second elongated tube 20 has an outer diameter preferably less than the outer diameter of the first tube 18 and sufficient to permit that tube to be removably received and clamped in the seat post collar 30 of seat 14 (also FIG. 1), preferably an outer diameter between about seven and eight-tenths of an inch. The second tube 20 need only be sufficiently long to permit it to be received in the seat post collar 30. The second tube 20 thus has a length shorter than the first tube length desirably less than about three inches and preferably about two and one-half inches or less.

Means, indicated generally at 32, are provided for fixedly securing together, and, preferably, for releasably, immovably securing together the first and second elongated tubes 18 and 20. Fixedly securing in this instance means without relative translational or rotational movement of the elongated tube tubes 18 and 20 with respect to one another. Preferably, means 32 comprises a first mating member, preferably in the form of a first elongated planar flange 34, which protrudes radially outwardly from an end (the upper end in the figures) of the first tube 18. Means 32 preferably further comprises a second mating member, preferably in the form of a second, identically elongated planar flange 36 protruding radially outwardly at an end (lower end in the figures) of the second tube 20 proximal the first tube 18. The planar flanges are parallel to one another to permit their joining together. Preferably, each of the first and second flanges 34 and 36 is fixedly secured to the first and second tubes 18 and 20, respectively, by suitable, conventional means such as brazing or, preferably, welding 68 (see FIG. 3). A first, removable fastener 40, a flexible support 41 (flexibly coupling the first fastener 40 with the first elongated tube 18), a second fixed fastener 42 and a flexible hose 44 having at its exposed end 48 an air valve coupling 50 are further depicted in FIG. 2. As is shown in FIG. 1, the pump 10 is preferably positioned with the first fastener 40 towards a front side of the seat 14 to fit into the space provided above the cross tube 27 of the frame 16 and the front side of the seat tube collar 28.

Figure 3:
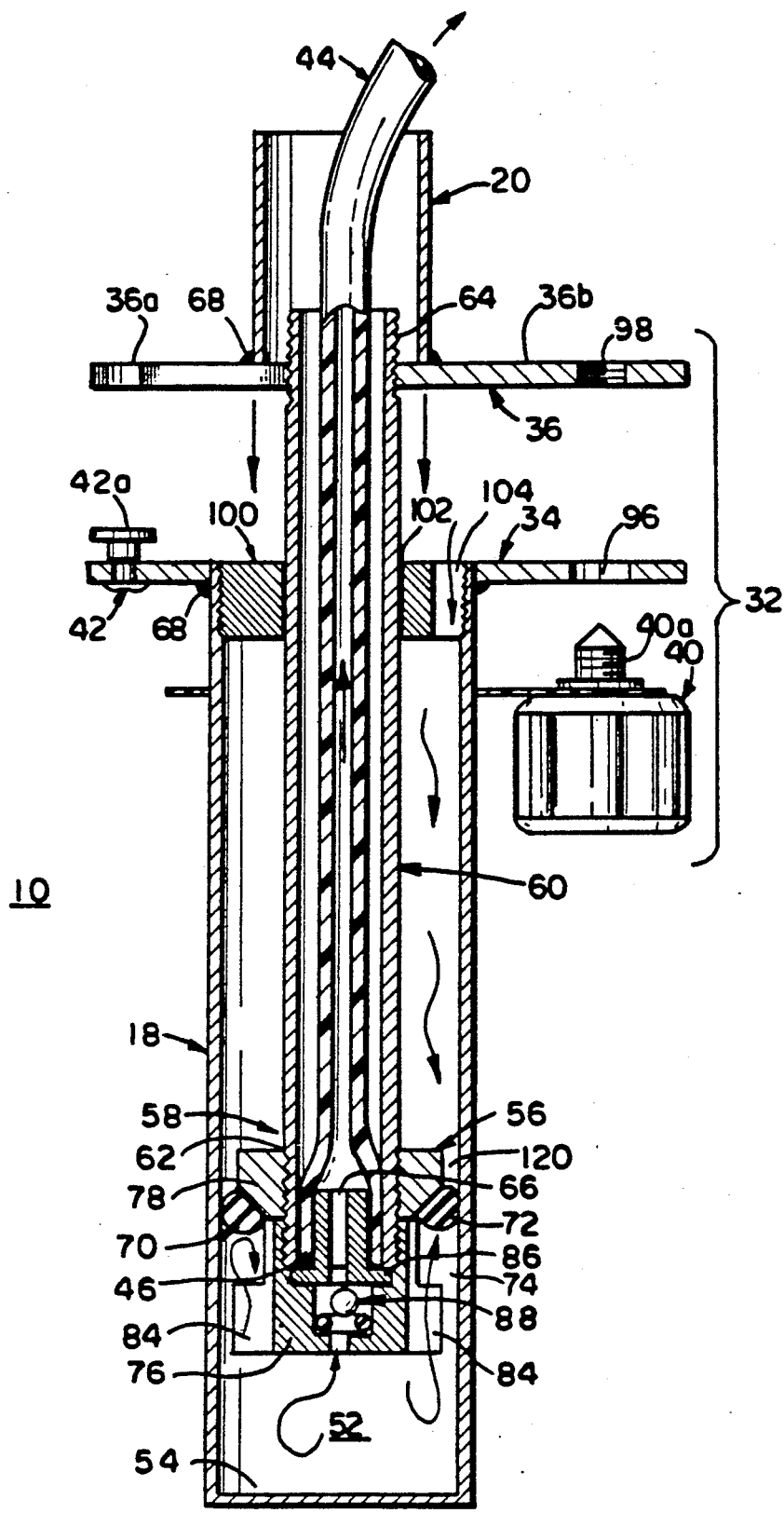
FIG. 3 is a cross-sectional elevation of the pump of FIGS. 1 and 2 during a compression stroke.
Figure 4:
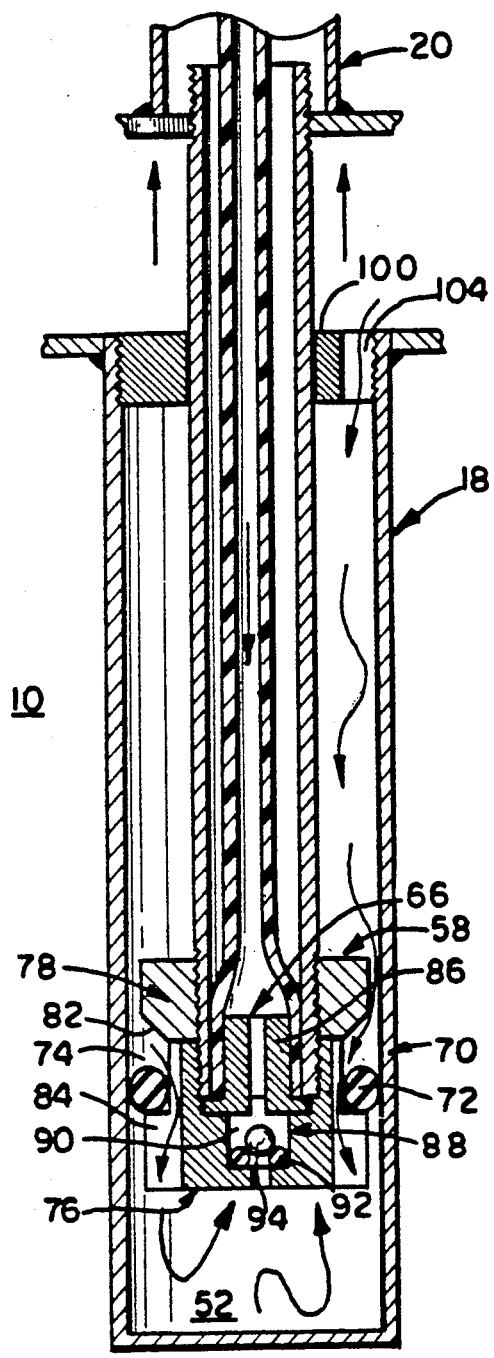
FIG. 4 is a cross-sectional elevation like FIG. 3 of the pump of FIGS. 1 and 2 during a refill stroke.

The internal construction of the pump 10 is revealed in FIGS. 3 and 4. The first elongated tube 18 constitutes a housing of the pump and defines a cylindrical pump chamber 52 therein having a closed end 54. A piston assembly, indicated generally at 56, is provided and includes a piston 58 within the chamber 52, a connecting arm 60 having a first end 62 coupled with the piston 58 and an opposing second end 64, and an air passage, indicated generally at 66, extending generally axially through the piston 58. The passage preferably continues through the connecting arm 60. The second end 64 of the connecting arm 60 is fixedly coupled with the second flange member 36 by suitable means such as mutually engaging threading. The second flange member 36 in turn fixedly supports the second elongated tube 20 which is secured to the second flange member 36 by suitable means such as the welds 68. Each of the second flange member 36 and the attached second elongated tube 20 provides a means for gripping the connecting arm 60 and manually reciprocating the piston 58 in the chamber 52. FIGS. 3 and 4 further depict a first, one-way valve means, indicated generally at 70, on the piston 58 and a second, one-way valve means, indicated generally at 88, along the air passage 66.

Referring to FIG. 3, the first valve means 70 preferably comprises an annular valve member 72, preferably an elastic O-ring, and a first groove 74. The first groove 74 extends circumferentially around an outer surface of the piston 58 and receives the annular valve member 72. Preferably, the first groove 74 has an axial dimension which is greater than the maximum axial dimension of the annular valve member 72, to permit axial movement of the valve member 72 along the groove 74. As also can be seen in FIGS. 3 and 4, the piston 58 preferably is fabricated from first and second annular components 76 and 78, respectively, which are attached by suitable means, such as threading, to the first end 62 of the connecting arm 64. The first annular component 76 has one end of reduced diameter and forms the bottom and one side of the first groove 74. The second annular component 78 preferably includes a beveled, generally frustoconical, circumferential surface 82 (best seen in FIG. 4) adjoining and facing the reduced diameter end of the first component 76. The beveled surface 82 forms a seat for the annular valve member 72. Surface 82 is located at an end of the groove 74 which is distal to the closed end 54 of the chamber 52. Opposing grooves 84 are provided axially along the circumferential surface of the first annular component 76. These grooves 84 define a portion of the circumferential groove 74 which is configured to permit air to pass between the annular valve member 72 and the piston 58 when the valve member 72 is located as shown in FIG. 4 over that portion of the circumferential groove 74 containing the axial extending grooves 84.

Preferably, a first end 46 of the flexible hose 44 is passed through the length of the connecting arm 60 and fixedly coupled to the first end 62 of the connecting arm 60 by means of an annular insert 86 which is received in the extreme end of the hose 44 clamping that end between the insert 86 and the inner circumferential surface of the connecting arm 60. Preferably, the outer cylindrical surface of the insert 86 which is received in the extreme end of the hose 44 is finished, for example by the provisions of threading or serrations, to better grip the first end 46 of the hose 44. In this way, the first end 46 of the hose 44 is fixedly coupled with the piston assembly 56 and the second tube 20 and pneumatically coupled with the air passage 66 in the piston 58.

Referring to FIG. 4, the insert 86 forms one seat of the second, one-way valve means 88 located along the air passage 66. The remainder of the second valve means 88 is preferably provided by an interior chamber 90, which is formed in the first annular component 76, an elastic O-ring 92, which forms an opposing seat of the valve means 88, and a valve member in the form of a sphere 94.

FIG. 3 further depicts details of the preferred means 32 for fixedly securing the first and second elongated tubes together. The preferred means 32 includes, in addition to the first and second flanges 34 and 36 and the first and second fasteners 40 and 42, an unthreaded bore 96 through the first flange member 34 and a threaded bore 98 through the second flange member 36. The threaded bore 98 is alignable with the unthreaded bore 96 for receiving a threaded portion 40a of the fastener 40 extending through the unthreaded bore 96, for fixedly securing together the mated first and second flange members 34 and 36 in a removable fashion. The second fastener 42 preferably is a rivet extending fixedly through the first flange 34 on a side of the tubes 18 and 20 diametrically opposed to the first fastener 40 and bores 96 and 98. A portion of the rivet 42, protruding axially from the first flange 34 towards the second flange 36, is received in a cut-out 36a, which is exposed on a side of the second flange 36, when the flanges 36 and 38 rotate to align the bores 96 and 98. Head portion 42a at the rivet 42 and the first flange 36 prevent relative axial movement of the second flange 38, thereby securing the tubes 18 and 20 together. The first and second fasteners 40 and 42 on opposing sides of the tubes 18 and 20 prevent bending of the pump at the flanges 36 and 38.

Lastly, an open end of the first elongated tube 18, opposite closed end 54, can be at least partially closed, for example by a third annular component 100, which includes a central bore 102 to permit extension of the second end 64 of the connecting arm 60 from the first elongated tube 18, and one or more additional bores, such as bore 104 which permits the free passage of air into and out of the first elongated tube 18. The component 100 prevents debris from entering the first tube 18. It may provide some support and guidance to the connecting arm 60 but the preferred construction of the piston assembly 56 is such that the assembly 56 maintains itself coaxial in the tube 18.

Figure 5:
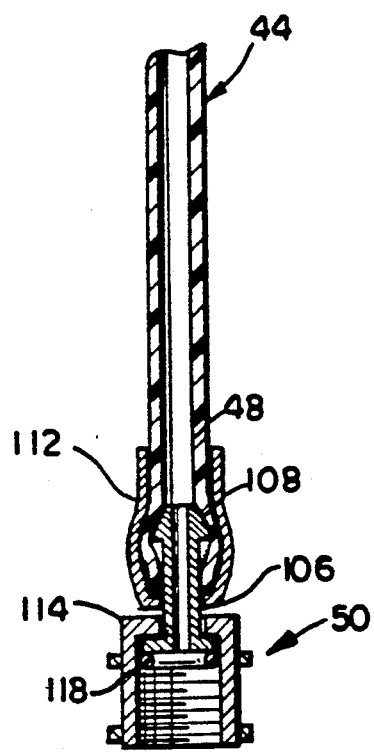
FIG. 5 is an expanded side section of a preferred air valve connector of the pump of FIGS. 1 through 4.

FIG. 5 depicts diagrammatically a preferred configuration for the air valve connector 50, also seen in FIG. 2. The connector 50 is mounted at a second end 48 of the flexible hose 44 and includes a central tubular member 106 one end of which has a conically tapered outer surface 108 which is inserted into the end 48 of hose 44. A fastening member 112 is clamped over the end 48 and one end of central member 106 fastening the connector 50 to the hose 44. A threaded collar 114 is rotatably supported at the remaining end of the central tubular member 106. The threaded collar 114 is sized to be received by a conventional air valve stem for coupling the flexible hose 44 to the stem. An annular sealing gasket 118, such as an O-ring, is preferably provided. It is specifically noted that unlike most conventional air valve connectors, the preferred connector 50 of the present invention lacks a central stalk or other solid structure for depressing the air valve in the valve stem (neither depicted). As will be subsequently explained in further detail, this is because the pump 10 of the present invention is capable of compressing air to a sufficiently high pressure to force depression of an air valve in a stem without physically contacting that valve.

Use and operation of the pump 10 will now be described with respect to the various figures. As shown in FIG. 1, the pump 10 can be constructed of suitable material with suitable dimensions, for example, about 1018 to 1027 mild steel seamless tubing, preferably mandrel drawn, with about a 50 mil wall thickness, as the elongated tubes 18 and 20, so as to permit use of the pump 10 as the seat post for supporting a conventionally constructed bicycle seat 14 on a conventionally constructed bike frame 16. The pump 10 may be originally installed or subsequently installed as a replacement for a conventional seat post.

The pump 10 may be used by removing the flexible hose 44 from the storage bag 15 (FIG. 1), if provided, and the air valve connector 50 attached to a conventional threaded air valve stem like that which is provided with tires, tubes or the like. The fastener 40 is unscrewed from the second flange 36 and the tubes 18 lo and 20 rotated to free rivet 42 from flange 36 to separate first and second tubes 18 and 20. The second tube 20, still fixedly secured to the seat 14, may be raised and lowered by raising and lowering the seat 14 while the pump is still mounted on the bicycle 12 to reciprocate the piston 58 along the chamber 52. After use, rivet 42 and cutout 36a may be engaged and the threaded portion 40a of fastener 40 may again be passed through unthreaded opening 96 into the threaded bore 98 for securing the first and second tubes 18 and 20 together. The air valve connector 50 may be removed from the valve stem and the flexible hose 44 returned to the storage bag 15, if provided. Of course, the pump 10 may be used as a conventional hand-operated air pump when not mounted in a bicycle. It may be installed as a seat post in and subsequently removed from any number of conventional bicycles, without alterations to either the bicycles or their seats, making the pump 10 extremely versatile.

FIGS. 3 and 4 depict in detail the operation of the first and second valve means 70 and 88, which provide the pump 10 of the present invention with certain unique capabilities. FIG. 3 depicts the positions of the first and second valve means 70 and 88 during a compression stroke when the piston assembly 56 is being moved in a first axial direction (down in the figure) into the first tube 18 and towards the closed end 54 of the chamber 52. FIG. 4 depicts the configuration of the two valve means 70 and 88 during a reciprocal, refill stroke when the piston 58 is being moved in a second, opposing axial direction away from the closed end 54 of the chamber 52.

Referring first to FIG. 3, during the compression stroke, air is compressed by the piston 58 in the closed end 54 of the chamber 52 by the first valve means 70. In particular, the O-ring valve member 72 tends to drag slightly on the inner wall of chamber 52 during movement of the piston 58 towards the closed end 54, seating on the beveled valve seat (82 in FIG. 4). The O-ring 72, being elastically deformable, expands further into contact with the inner circumferential surface of the chamber 52 when that valve member 72 is seated against the valve seat 82 by the compressed air trapped in the closed end 54 of the chamber 52 to further seal the annular gap 120 which exists between the inner circumferential surface of the chamber 52 and the outer circumferential surface of the piston 58. In this regard, the beveled valve seat 82 used in connection with the elastic O-ring 72 is a very important feature of the invention. As the pressure of the air being compressed by the piston 58 builds up in the closed end 54, the O-ring 72 is pressed increasingly harder onto the tapered valve seat 82 and into the narrowing gap formed between the beveled surface of the seat 82 and the inner circumferential surface of the chamber 52, thereby expanding the O-ring 72 into contact with the inner circumferential surface of the chamber 52 and increasing the sealing effect. This particular configuration permits the preferred pump 10 to compress air to pressures of up to at least about two hundred psi. The major limitation to maximum air compression of the pump 10 is not the operation of the pump but rather the ability of the user to apply sufficient force to the piston assembly 56 to further compress the air.

Preferably, a single, first tube 18 defines both a housing and the cylindrical pump chamber contained therein. However, since the optimum outer diameter of the first tube 18 must be sufficiently large to permit that tube 18 to be clamped within a seat tube collar 28 of conventional construction, the diameter of the cylindrical chamber may be reduced, thereby reducing the cross-sectional area of the chamber 52 and total force which must be applied to the piston assembly 56 to achieve a given compression, for example by the use of the second elongated tube (not depicted) within the first elongated tube 18 to reduce the diameter of the cylindrical pump chamber 52.

During the compression stroke, the valve member sphere (94 in FIG. 4) of the second valve means 88 is eventually forced from the surface of the O-ring (92 in FIG. 4) when the pressure of the air being compressed at the closed end 54 of the chamber 52 exceeds the pressure of the air in the air passage 66, thereby permitting compressed air to pass from the chamber 52 into the air passage 66.

Referring to FIG. 4, during the reciprocal or refill stroke, the piston 58 is moved in a second, opposing axial direction (up in the figure) away from the closed end 54. Friction between the O-ring valve member 72 and the inner circumferential surface of the chamber 52 causes the member 72 to move away from the beveled seat 82 and over the axially extending grooves 84, thereby permitting air, which enters the first tube 18 through the additional bore 104 of the third annular component 100, to pass between the piston 58 and the O-ring 72 and enter the closed end 54 of the chamber 52. At the same time, the compressed air in the air passage 66 and/or any partial vacuum created at the closed end 54 of the chamber 52 cause the sphere 94 of the second valve means 88 to be received in the seat provided by O-ring 92 thereby preventing air from passing through the air passage 66 into the chamber 52.

Although an elastic O-ring is preferred as the annular valve member 72 of the first valve means 70, it would be possible, though less desirable, to provide a substantially inelastic annular valve member, for example one of PTFE or nylon, and an at least resiliently and, preferably, elastically deformable, beveled valve seat 82 which is outwardly expanded into contact with the inner circumferential surface of the chamber 52 when the valve member 72 is seated against the valve seat 82 by compressed air in the chamber 52 for sealing the annular gap 120 seen in FIG. 3. Similarly, although a frustoconical beveled surface is preferred for the valve seat 82, other sloping surface configurations may be employed.

While the disclosed pump is eminently suitable for manual operation and for use as the seat post of a bicycle, the pump 10 may be modified for automatic, mechanical reciprocation and may be modified to pump other fluids, namely liquids.

From the foregoing description, it can be seen that the present invention provides a unique, versatile, and manually operable pump, which can be configured as a bicycle air pump possessing significant advantages over conventional bicycle air pumps.

While various modifications have been described and/or suggested, one of ordinary skill in the art will recognize that changes could be made to the above-described embodiment of the invention without departing from the broad inventive concepts thereof. It is understood, therefore, that this invention is not limited to the particular embodiment(s) disclosed, but is intended to cover any modifications which are within the scope and spirit of the invention, as defined by the appended claims.

I claim:

1. A manually-operable bicycle seat post air pump comprising:

a housing containing a pump chamber having a closed end;

a piston assembly including a piston within the chamber, a connecting arm having a first end coupled with the piston and an opposing second end, and an air passage extending generally axially through the piston;

means coupled with the connecting arm for manually reciprocating the piston in the chamber;

first, one-way valve means on the piston for compressing air in the closed end of the chamber when the piston is moved in a first axial direction towards the closed end of the chamber and for permitting air to enter the closed end of the chamber when the piston is moved in a second, opposing axial direction away from the closed end of the chamber; and second, one-way valve means along the air passage for permitting air to pass from the chamber into the air passage when the piston is being moved in the first axial direction and for preventing air from passing through the air passage into the chamber when the piston is being moved in the second axial direction; wherein the housing comprises a first elongated tube having an outer diameter sufficient to permit the first tube to be removably received and clamped in a seat tube of a bicycle frame, and the means for manually reciprocating comprises a second elongated tube having an outer diameter sufficient to permit the second tube to be removably received and clamped in a seat post collar of a bicycle seat and further comprising means for releasably immovably securing together the first and second elongated tubes.

2. The pump of claim 1 in combination with the bicycle seat clamped to the second tube.

3. The pump of claim 1 wherein the means for releasably, immovably securing comprises a first mating member protruding radially from an end of the first tube, the first mating member limiting depth to which the first tube can be inserted into the seat tube of the frame.

4. The manual pump of claim 3 wherein the means for releasably securing further comprises a second mating member coupled with the second tube, the first and second members being configured to be joined together.

5. The pump of claim 4 wherein the first and second mating members are first and second elongated planar flanges, respectively, wherein the means for fixedly securing comprises a first, removable fastener extending through the first and second flanges.

6. The pump of claim 5 wherein the means for fixedly securing comprises a second fastener extending through the first and second flanges on a side of the first and second elongated tubes opposite the first fastener.

7. The pump of claim 1 further comprising a flexible hose having a first end pneumatically coupled with the air passage.

8. The pump of claim 7 wherein the air hose extends generally axially through the connecting arm.

9. The pump of claim 7 further comprising an air valve coupling at a second end of the flexible hose, the air valve coupling having an open cavity defining an end of the air passage and configured for receiving a valve stem whereby an air valve in the valve stem is contacted only by air in the air passage.

10. The pump of claim 1 wherein the first tube is longer than the second tube.

11. The pump of claim 1 wherein the first tube is one-piece and has an integral closed end forming the closed end of the pump chamber.

12. A bicycle seat post air pump comprising:
a first elongated tube having a length and outer diameter sufficient for removable receipt in a seat tube of a bicycle frame and clamping by a collar of the seat tube;
a second elongated tube having a length shorter than the first elongated tube length and an outer diameter less than the first elongated tube outer diameter, the length and outer diameter of the second tube being sufficient for removable receipt and clamping of the second tube in a seat post collar of a bicycle seat;
one of the first and second elongated tubes forming a pump chamber and the remaining one of the first and second elongated tubes being coupled with a piston in the pump chamber for reciprocating the piston;
means for releasably, immovably securing together the first and second elongated tubes;
a flexible air hose having a first end coupled with the second elongated tube; and
an air valve coupling at a second end of the flexible hose.

13. The pump of claim 12 wherein the first elongated tube forms the pump chamber, wherein the pump further comprises a connecting arm fixedly coupling the second elongated tube with the piston, an air passage extending generally axially through the piston, and the first end of the air hose being coupled with the connecting arm.

14. A manually-operable bicycle seat post air pump comprising:
a housing containing a pump chamber having a closed end;
a piston assembly including a piston within the chamber, a connecting arm having a first end coupled with the piston and an opposing second end, and an air passage extending generally axially through the piston;
means coupled with the connecting arm for manually reciprocating the piston in the chamber;
first, one-way valve means on the piston for compressing air in the closed end of the chamber when the piston is moved in a first axial direction towards the closed end of the chamber and for permitting air to enter the closed end of the chamber when the piston is moved in a second, opposing axial direction away from the closed end of the chamber; and
second, one-way valve means along the air passage for permitting air to pass from the chamber into the air passage when the piston is being moved in the first axial direction and for preventing air from passing through the air passage into the chamber when the piston is being moved in the second axial direction; wherein the first valve means includes an annular valve member and a groove extending circumferentially around an outer surface of the piston and receiving the annular valve member, the groove having an axial dimension greater than a maximum axial dimension of the annular valve member to permit the valve member to move axially along the groove, and a portion of the groove being configured to permit air to pass between the valve member and the piston when the valve member is located along the portion of the groove wherein the housing comprises a first elongated tube having an outer diameter sufficient to permit the first tube to be removably received and clamped in a seat tube of a bicycle frame and wherein the means for manually reciprocating comprises a second elongated tube having an outer diameter sufficient to permit the second tube to be removably received and clamped in a seat post collar of a bicycle seat, said pump further comprising means for releasably immovably securing together the first and second tubes.

15. The pump of claim 14 wherein the first tube is longer than the second tube.

16. The pump of claim 14 wherein the piston includes a circumferential valve seat at an end of the groove distal to the closed end of the chamber for receiving the valve member while the piston is being moved axially towards the closed end of the chamber to compress air in the chamber, at least one of the annular valve member and the valve seat being made of a resiliently deformable material for expanding into contact with an inner circumferential surface of the chamber when the valve member is seated against the valve seat by compressed air in the chamber for sealing an annular gap between the inner circumferential surface of the chamber and the outer circumferential surface of the piston.

17. The pump of claim 16 wherein the resiliently deformable one is an elastically deformable O-ring valve member.

18. The pump of claim 16 wherein the valve seat is a generally frustoconical surface.

19. The pump of claim 17 wherein the valve seat is generally tapered for compressing the O-ring valve member against the inner circumferential surface of the chamber and wherein the housing comprises a one-piece ferrous tube having an integral, closed end forming the closed end of the pump chamber.

* * * * *